United States Patent
Moffatt et al.

(10) Patent No.: US 12,304,308 B2
(45) Date of Patent: May 20, 2025

(54) METHODS AND SYSTEMS FOR OPERATING A PERIPHERAL DEVICE OF A VEHICLE

(71) Applicant: Ford Global Technologies, LLC, Dearborn, MI (US)

(72) Inventors: Benjamin Moffatt, Iver (GB); Ian Salsbury, Wickford (GB); Yasmin Jawad, Dearborn, MI (US); Sheraz Atiq, Wickford (GB); Tithal Bhandari, Westland, MI (US); Joseph Hornby, London (GB); Sanketh S. Venkatesh Prasad, Bloomington, IL (US)

(73) Assignee: Ford Global Technologies, LLC, Dearborn, MI (US)

( * ) Notice: Subject to any disclaimer, the term of this patent is extended or adjusted under 35 U.S.C. 154(b) by 211 days.

(21) Appl. No.: 17/948,042

(22) Filed: Sep. 19, 2022

(65) Prior Publication Data
US 2024/0092168 A1 Mar. 21, 2024

(51) Int. Cl.
| | | |
|---|---|---|
| B60K 35/00 | (2024.01) | |
| B60K 35/10 | (2024.01) | |
| B60K 35/22 | (2024.01) | |
| B60K 35/80 | (2024.01) | |
| B60R 16/023 | (2006.01) | |

(52) U.S. Cl.
CPC ......... B60K 35/00 (2013.01); B60R 16/023 (2013.01); *B60K 35/10* (2024.01); *B60K 35/22* (2024.01); *B60K 35/80* (2024.01); *B60K 2360/11* (2024.01)

(58) Field of Classification Search
CPC ........ B60K 25/00; B60K 35/00; B60K 35/10; B60K 35/22; B60K 35/20; B60K 35/50; B60K 35/60; B60K 35/80; B60K 2360/11; B60K 2360/55; B60K 2360/56; B60K 2360/573; B60R 16/023; B60R 16/027; B60W 10/30; B60W 30/1886; B60W 30/1888; B60W 2040/0809; B60W 2050/0063; B60W 2050/0064; B60W 2050/0066; B60W 2050/0067; B60W 2510/30; B60W 2510/305; B60W 2540/215; B60W 2710/30; B60W 2710/305
See application file for complete search history.

(56) References Cited

U.S. PATENT DOCUMENTS 8,046,501 B2 * 10/2011 Gormley ............ G05B 19/0421
710/33
2002/0096572 A1 * 7/2002 Chene ................ B60H 1/00657
236/62

(Continued)

FOREIGN PATENT DOCUMENTS

JP 2015-188428 A 11/2015

*Primary Examiner* — Russell Frejd
*Assistant Examiner* — Brandon Z Willis
(74) *Attorney, Agent, or Firm* — Haley Guilianon LLP

(57) ABSTRACT

Systems and methods are described for operating a peripheral device of a vehicle. Control circuitry determines whether the peripheral device is connected to a vehicle controller. Control circuitry receives operational settings for the peripheral device, e.g., in response to determining that the peripheral device is connected to the vehicle controller. The vehicle controller is used to control the peripheral device using the received operational settings.

11 Claims, 6 Drawing Sheets

(56) References Cited

U.S. PATENT DOCUMENTS

| | | |
|---|---|---|
| 2006/0241838 A1 | 10/2006 | Mongiardo et al. |
| 2011/0060507 A1 | 3/2011 | Vanhercke et al. |
| 2015/0202962 A1* | 7/2015 | Habashima ........... G06T 19/006 345/633 |
| 2020/0150858 A1* | 5/2020 | Luna Garcia ......... G06F 3/0488 |
| 2020/0198561 A1* | 6/2020 | Weed .................... B60K 35/00 |
| 2020/0254875 A1* | 8/2020 | Strandberg ............ G06F 3/0484 |

* cited by examiner

METHODS AND SYSTEMS FOR OPERATING A PERIPHERAL DEVICE OF A VEHICLE

BACKGROUND

The present disclosure relates to methods and systems for operating a peripheral device of a vehicle. Particularly, but not exclusively, the present disclosure relates to automatically configuring a peripheral device upon connection to a vehicle.

SUMMARY

It is common for a vehicle to be fitted with aftermarket equipment, e.g., for use in the commercial or domestic sectors. For example, a vehicle owner may wish to install one or more peripheral devices, such as a fridge, a tool, construction equipment or other devices, like lights, to a vehicle. In some cases, a specialist upfitter may convert a conventional vehicle into a special vehicle, such as an ambulance or a campervan, by installing multiple types of peripheral devices to a vehicle. Given the vast number of different types of peripheral devices and the manner in which they are controlled, it is desirable to simplify how such peripheral devices connect to and are controlled using a vehicle interface.

Systems and methods are provided herein for improving the usage of a vehicle peripheral device installed to a vehicle, e.g., by automatically providing appropriate operational settings for controlling the peripheral device, in response to connecting the peripheral device to the vehicle. Such systems and methods allow for "plug and play" operation of vehicle peripheral device.

According to some examples, methods and systems are provided for operating a peripheral device of a vehicle. Control circuitry determines whether the peripheral device is connected to a vehicle controller. Control circuitry receives operational settings for the peripheral device, e.g., in response to determining that the peripheral device is connected to the vehicle controller. The vehicle controller is used to control the peripheral device using the received operational settings. In some examples, a vehicle system is controlled using the received operational settings.

In some examples, the operational settings comprise instructions for installing a soft switch configuration, e.g., on a vehicle interface. In some examples, the soft switch configuration is installed on a vehicle interface in response to determining the peripheral device is connected to the vehicle controller.

In some examples, a task is assigned to the vehicle, e.g., by a fleet operator. Control circuitry may determine one or more operational parameters relating to the intended operation of the vehicle and the peripheral device during the task. Control circuitry may select the operational settings based on the one or more operational parameters.

In some examples, control circuitry determines whether a database comprises operational settings corresponding to the one or more operational parameters. In response to determining that the database does not comprise operational settings corresponding to the one or more operational parameters, new operational settings may be generated.

In some examples, control circuitry determines a location of the vehicle. In some examples, the operational settings are implemented based on the location of the vehicle.

In some examples, the vehicle controller requests a user authentication. In some examples, control circuitry is configured to provide or allow operational access to the peripheral device based on the user authentication.

In some examples, the operational settings are provided for user review on a vehicle interface. In some examples, control circuitry requests user approval of the operational settings. In response to receiving user approval of the operational settings, control circuitry may implement the operational settings on the vehicle controller. In response to receiving user disapproval of the operational settings, control circuitry may modify the operational settings, e.g., automatically or based on operator input.

In some examples, control circuitry determines an operational status of the vehicle and the peripheral device. In some examples, the operational settings may be selected based on the operational status of the vehicle and the peripheral device.

In one aspect, a vehicle is provided comprising control circuitry configured to determine whether a peripheral device is connected to a vehicle controller; receive, at the vehicle controller, operational settings for the peripheral device; and control, using the vehicle controller, the peripheral device using the operational settings.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
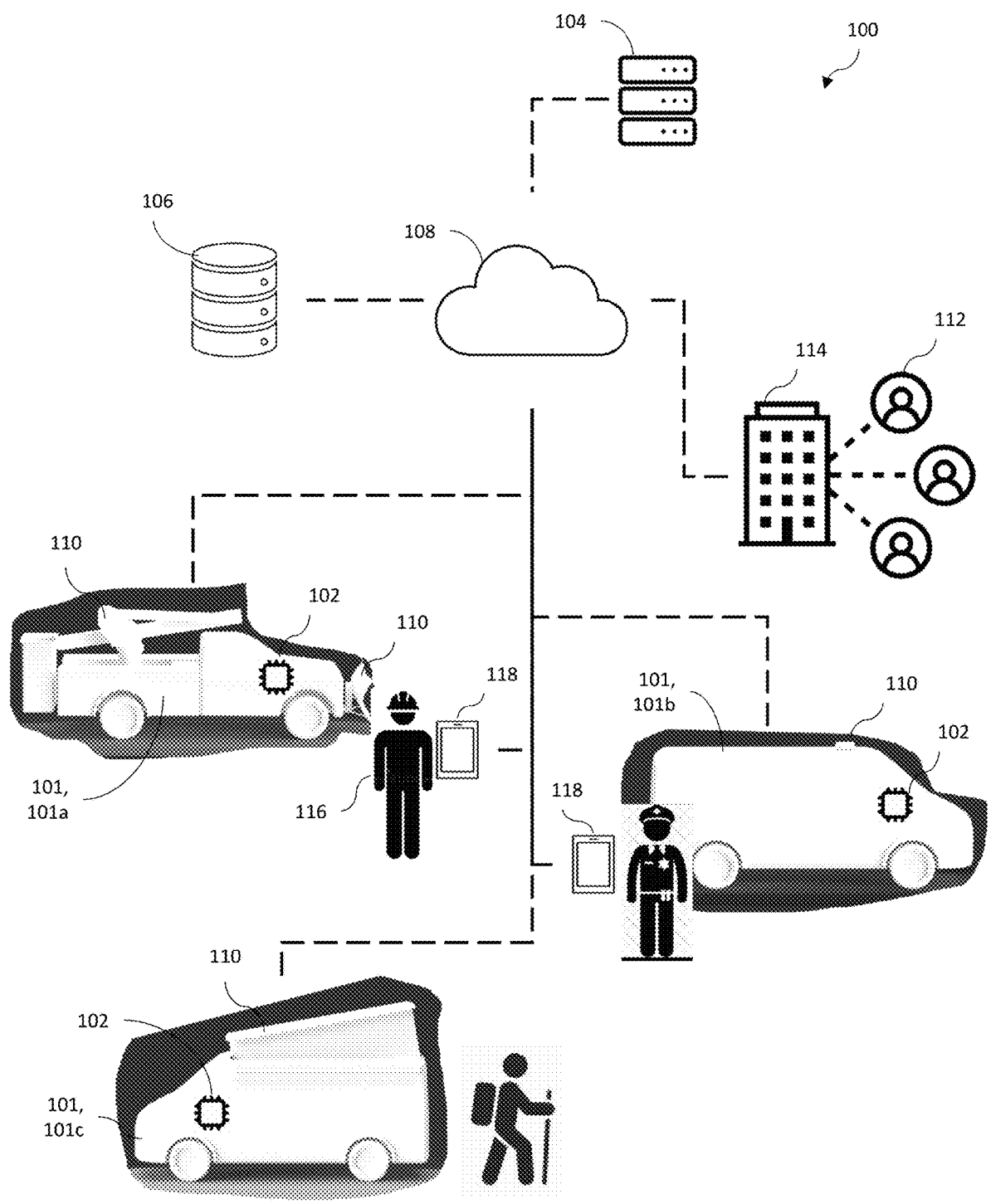
FIG. 1 illustrates overview of the system for operating a peripheral device of a vehicle, in accordance with some examples of the disclosure.

FIG. 1 illustrates an overview of a system 100 for operating a peripheral device 110 of a vehicle. In particular, the example shown in FIG. 1 illustrates various vehicles 101 communicatively coupled to a server 104 and a database 106, e.g., via network 108. For example, each vehicle 101 may be a different type of vehicle, such as a construction vehicle 101*a*, an emergency service vehicle 101*b* or a campervan 101*c*. Each vehicle 101 comprises a controller 102 (or network of controllers) that enables operational communication between one or more peripheral devices 110 installed to the vehicle 101 and an operator 112 at control centre 114, e.g., via server 104. In this manner, operator 112 may cause operational settings, e.g., which may be stored on database 106, to be issued to one or more vehicle controllers 102. For example, operator 112 may be a fleet manager who wishes to issue operation settings for a peripheral device 110 installed on a vehicle 101. In the example shown in FIG. 1, the peripheral devices 110 installed to vehicle 101*a* are a cherry picker and a plough, the peripheral device 110 installed to vehicle 101*b* is a siren, and the peripheral device 110 installed to vehicle 101*c* is a moveable roof compartment. While the example illustrated in FIG. 1 shows various types of vehicles 101 and peripheral devices 110 operationally coupled to the control centre 114, the present disclosure is not limited to such an arrangement. For example, the control centre 114 may be a centre for fleet operations of a single category of vehicle, such as emergency service vehicles or construction vehicles. In some examples, the control centre 114 may be a domestic location, such a user's home. In some examples, control centre 114 may be operational base of a vehicle manufacturer, such as a Ford control centre, in operational communication with various types of Ford vehicles and corresponding, e.g., Ford-approved, peripheral devices 110.

In the context of the present disclosure, the term "operational settings" is used to describe one or more instructions and/or configurations that determine how a peripheral device can be controlled or operated. For example, an operational setting may relate to the manner in which a peripheral device may be operated, e.g., moved, may designate one or more users who are allowed to control the peripheral device, and/or may designate a time and/or location at which the peripheral device may be operated. Additionally or alternatively, an operational setting may relate to the manner in which a vehicle may be operated, e.g., a vehicle having a peripheral device installed and connected to a controller of the vehicle.

The systems and methods disclosed herein enable operational settings to be received at a vehicle. The operational setting may relate to how a peripheral device 110 may be used in conjunction with a vehicle 101, e.g., for a particular task. To put this into context, a fleet operator, e.g., operator 112, may dispatch a certain type of job or task to be carried out by a vehicle and its operator 116. For example, operator 112 may issue a task to vehicle 101*a*, the task comprising instructions to plough snow along a certain portion of road and fix a broken power line. As such, there exists a set of conditions in which operator 112 may wish to control, e.g., by allowing operator 116 of vehicle 101*a* to control at certain times/locations, the operation of the cherry picker and the plough. For example, operator 112 may wish to restrict usage of the cherry picker while travelling to the location of the damaged power line, while enabling the use and control of the plough by operator 116 at other times/locations. In particular, operator 112 may issue operational settings that determine a soft switch configuration on a vehicle interface 118. In the example shown in FIG. 1, vehicle interface 118 is a user device, such as a smartphone, for the sake of clarity in FIG. 1. However, in other examples, vehicle interface 118 may be an interface of the vehicle, such as a screen in the instrument panel of the vehicle, as shown in FIGS. 5A and 5B. For the avoidance of doubt, system 100 may include one or more vehicle interfaces 118 of any appropriate type that provides a user interface allowing a user to control a function of a peripheral device 110 and/or a function of a vehicle 101. System 100 may also include network 108 such as the Internet, configured to communicatively couple vehicle controller 102 (and thus vehicle interface 118) to one or more servers 104 and/or one or more databases 106 from which content, such as operational settings, can be received. Vehicle controller 102 and the one or more servers 104 may be communicatively coupled to one another by way of network 108, and the one or more servers 104 may be communicatively coupled to database 106 by way of one or more communication paths, such as a proprietary communication path and/or network 108.

Figure 2:
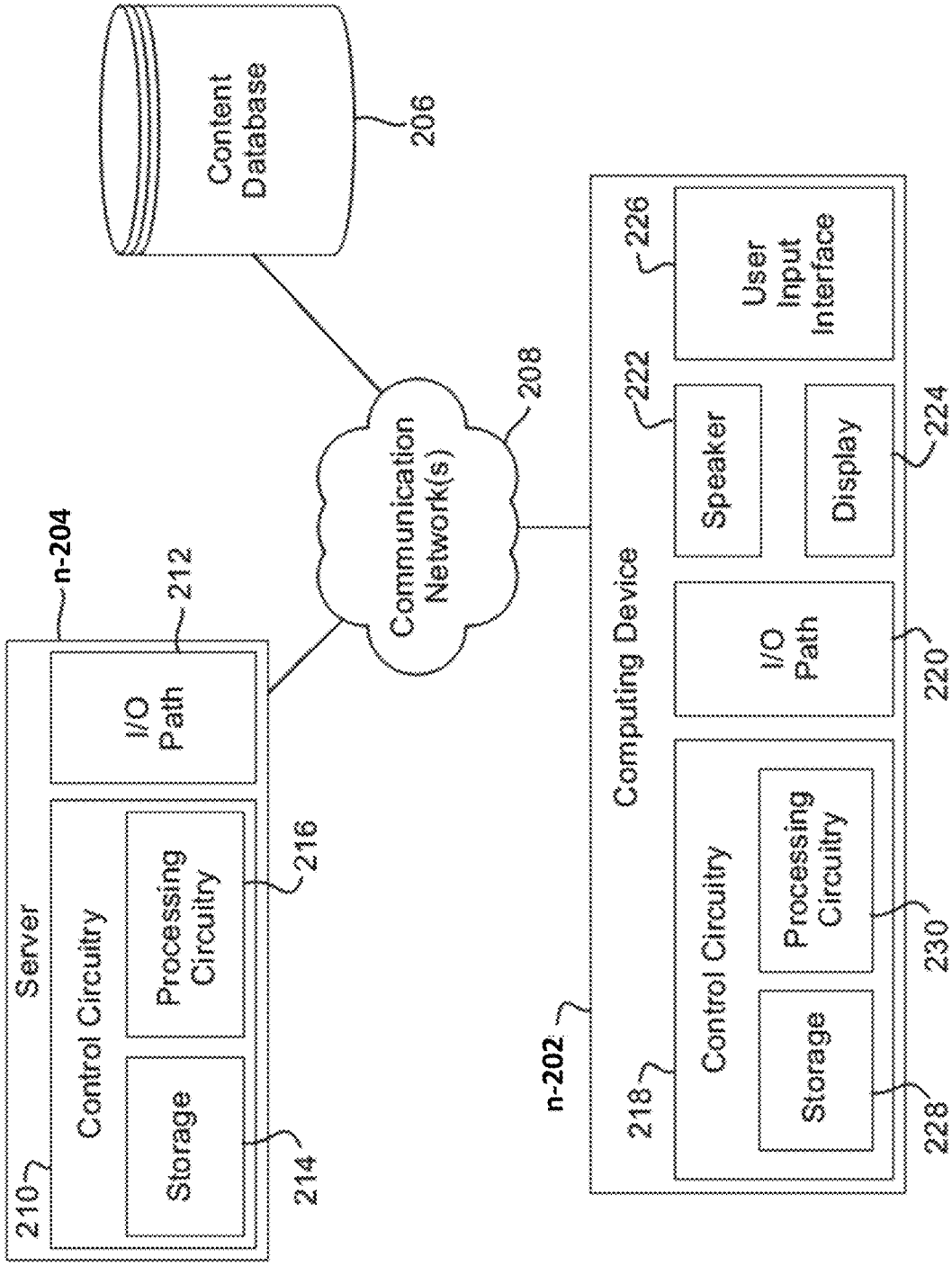
FIG. 2 is a block diagram showing components of an example system for operating a peripheral device of a vehicle, in accordance with some examples of the disclosure.

FIG. 2 is an illustrative block diagram showing example system 200 configured to issue operational settings to vehicle controller 102. Although FIG. 2 shows system 200 as including a number and configuration of individual components, in some examples, any number of the components of system 200 may be combined and/or integrated as one device, e.g., as a user device, such as a laptop. System 200 includes computing device n-202 (denoting any appropriate number of computing devices, such as controller 102), server n-204 (denoting any appropriate number of servers, such as server 104), and database 206, each of which is communicatively coupled to communication network 208, which may be the Internet or any other suitable network or group of networks. In some examples, system 200 excludes server n-204, and functionality that would otherwise be implemented by server n-204 is instead implemented by other components of system 200, such as computing device n-202. For example, computing device n-202 may implement some or all of the functionality of server 104. In still other examples, server n-204 works in conjunction with computing device n-202 to implement certain functionality described herein in a distributed or cooperative manner.

Server n-204 includes control circuitry 210 and input/output (hereinafter "I/O") path 212, and control circuitry 210 includes storage 214 and processing circuitry 216. Computing device n-202, which may be an HMD, a personal computer, a laptop computer, a tablet computer, a smartphone, a smart television, or any other type of computing device, includes control circuitry 218, I/O path 220, speaker 222, display 224, and user input interface 226. For example, computing device n-202 may comprise controller 102 and vehicle interface 118.

Control circuitry 218 includes storage 228 and processing circuitry 230. Control circuitry 210 and/or 218 may be based on any suitable processing circuitry such as processing circuitry 216 and/or 230. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad- core, hexa-core, or any suitable number of cores). In some examples, processing circuitry may be distributed across multiple separate processors, for example, multiple of the same type of processors (e.g., two Intel Core i9 processors) or multiple different processors (e.g., an Intel Core i7 processor and an Intel Core i9 processor).

Each of storage 214, 228, and/or storages of other components of system 200 (e.g., storages of database 206, and/or the like) may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 2D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each of storage 214, 228, and/or storages of other components of system 200 may be used to store various types of content, metadata, and or other types of data. Non-volatile memory may also be used (e.g., to launch a boot-up routine and other instructions). Cloud-based storage may be used to supplement storages 214, 228 or instead of storages 214, 228. In some examples, control circuitry 210 and/or 218 executes instructions for an application stored in memory (e.g., storage 214 and/or 228). Specifically, control circuitry 210 and/or 218 may be instructed by the application to perform the functions discussed herein. In some implementations, any action performed by control circuitry 210 and/or 218 may be based on instructions received from an application. For example, the application may be implemented as software or a set of executable instructions that may be stored in storage 214 and/or 228 and executed by control circuitry 210 and/or 218. In some examples, the application may be a client/server application where only a client application resides on computing device n-202, and a server application resides on server n-204.

The application may be implemented using any suitable architecture. For example, it may be a stand-alone application wholly implemented on computing device n-202. In such an approach, instructions for the application are stored locally (e.g., in storage 228), and data for use by the application is downloaded on a periodic basis (e.g., from an out-of-band feed, from an Internet resource, or using another suitable approach). Control circuitry 218 may retrieve instructions for the application from storage 228 and process the instructions to perform the functionality described herein. Based on the processed instructions, control circuitry 218 may determine what action to perform when input is received from user input interface 226.

In client/server-based examples, control circuitry 218 may include communication circuitry suitable for communicating with an application server (e.g., server n-204) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 208). In another example of a client/server-based application, control circuitry 218 runs a web browser that interprets web pages provided by a remote server (e.g., server n-204). For example, the remote server may store the instructions for the application in a storage device. The remote server may process the stored instructions using circuitry (e.g., control circuitry 210) and/or generate displays. Computing device n-202 may receive the displays generated by the remote server and may display the content of the displays locally via display 224. This way, the processing of the instructions is performed remotely (e.g., by server n-204) while the resulting displays, such as the display windows described elsewhere herein, are provided locally on computing device n-202. Computing device n-202 may receive inputs from the user via input interface 226 and transmit those inputs to the remote server for processing and generating the corresponding displays.

A user device may send instructions to control circuitry 210 and/or 218 using user input interface 226. User input interface 226 may be any suitable user interface, such as a remote control, trackball, keypad, keyboard, touchscreen, touchpad, stylus input, joystick, voice recognition interface, gaming controller, or other user input interfaces. User input interface 226 may be integrated with or combined with display 224, which may be a monitor, a television, a liquid crystal display (LCD), an electronic ink display, or any other equipment suitable for displaying visual images.

Server n-204 and computing device n-202 may transmit and receive content and data via I/O path 212 and 220, respectively. For instance, I/O path 212, and/or I/O path 220 may include a communication port(s) configured to transmit and/or receive (for instance to and/or from database 206), via communication network 208, content item identifiers, content metadata, natural language queries, and/or other data. Control circuitry 210 and/or 218 may be used to send and receive commands, requests, and other suitable data using I/O paths 212 and/or 220.

Figure 3:
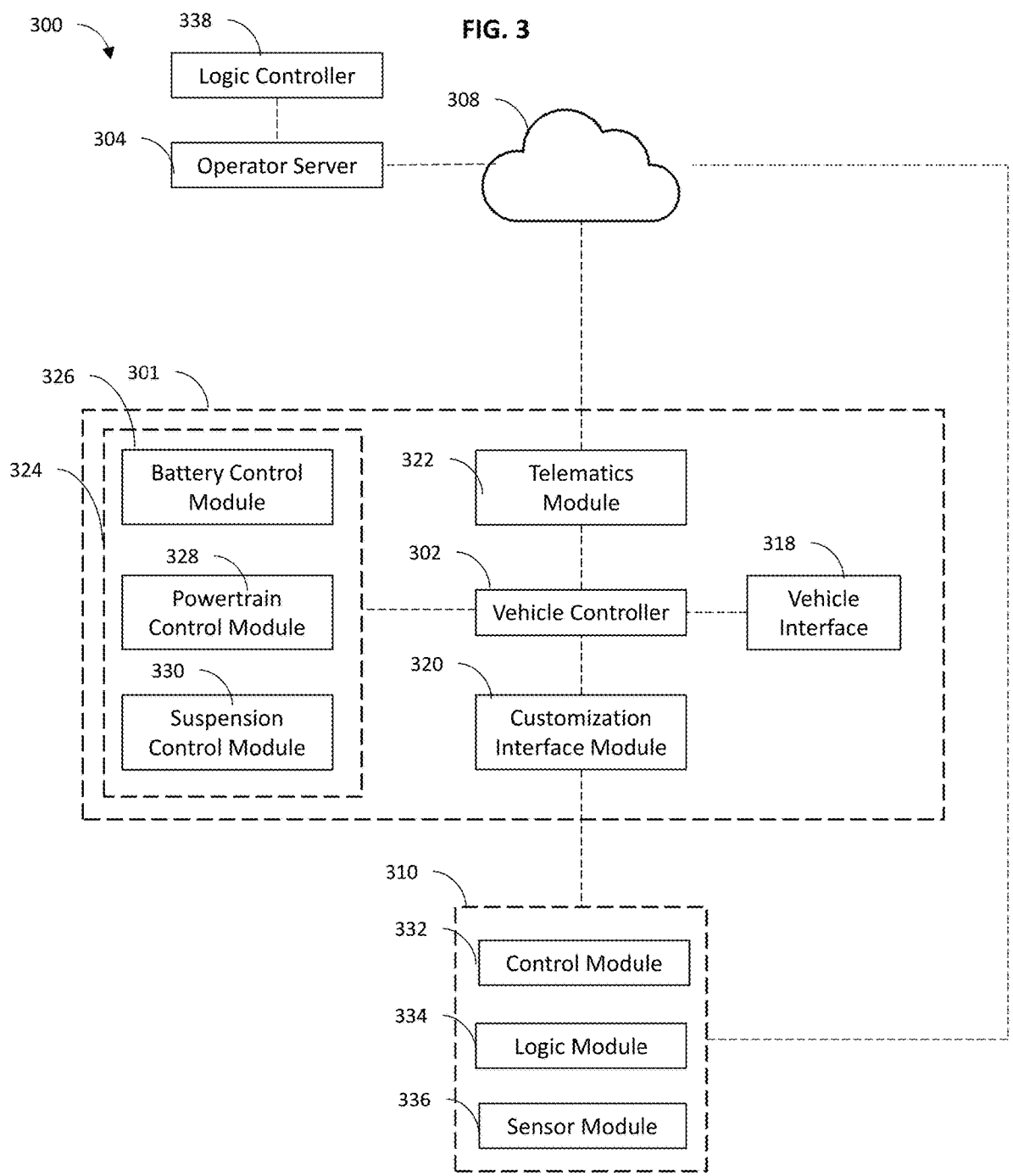
FIG. 3 is a block diagram showing components of an example system for operating a peripheral device of a vehicle, in accordance with some examples of the disclosure.
Figure 4:
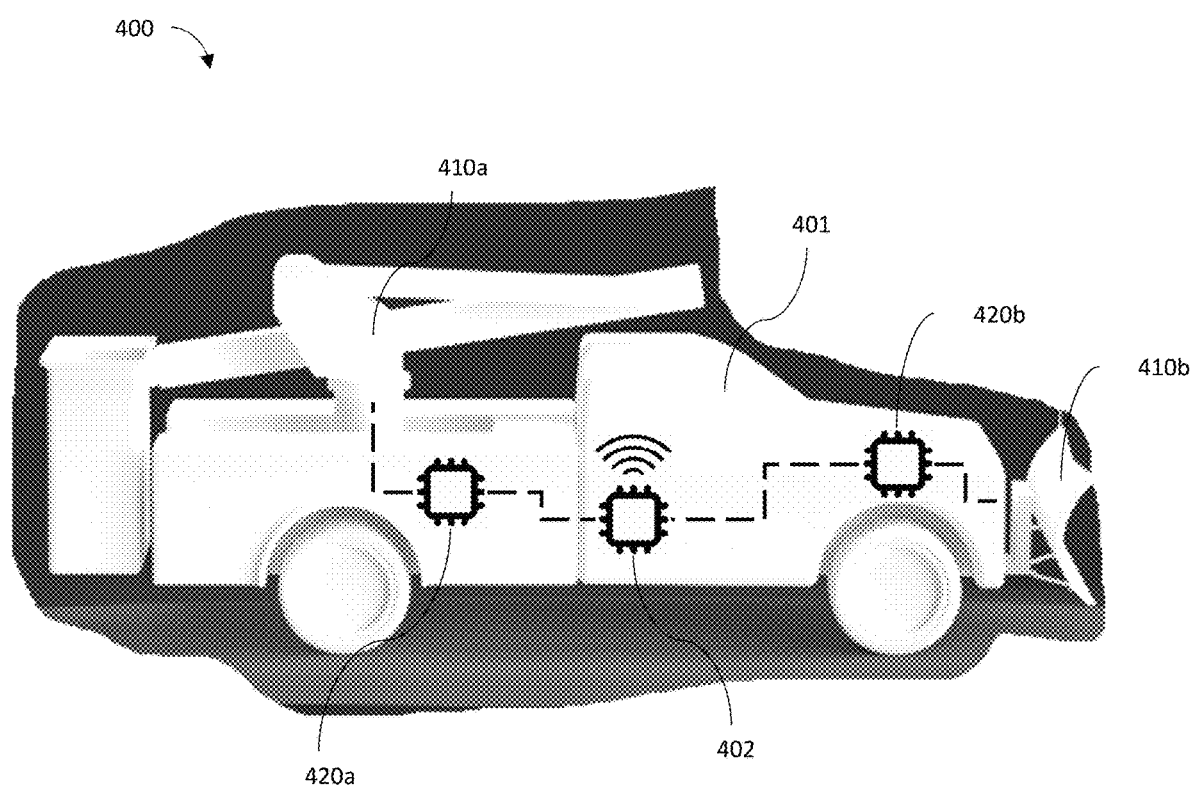
FIG. 4 illustrates an example of vehicle fitted with a peripheral device, in accordance with some examples of the disclosure.
Figure 5:
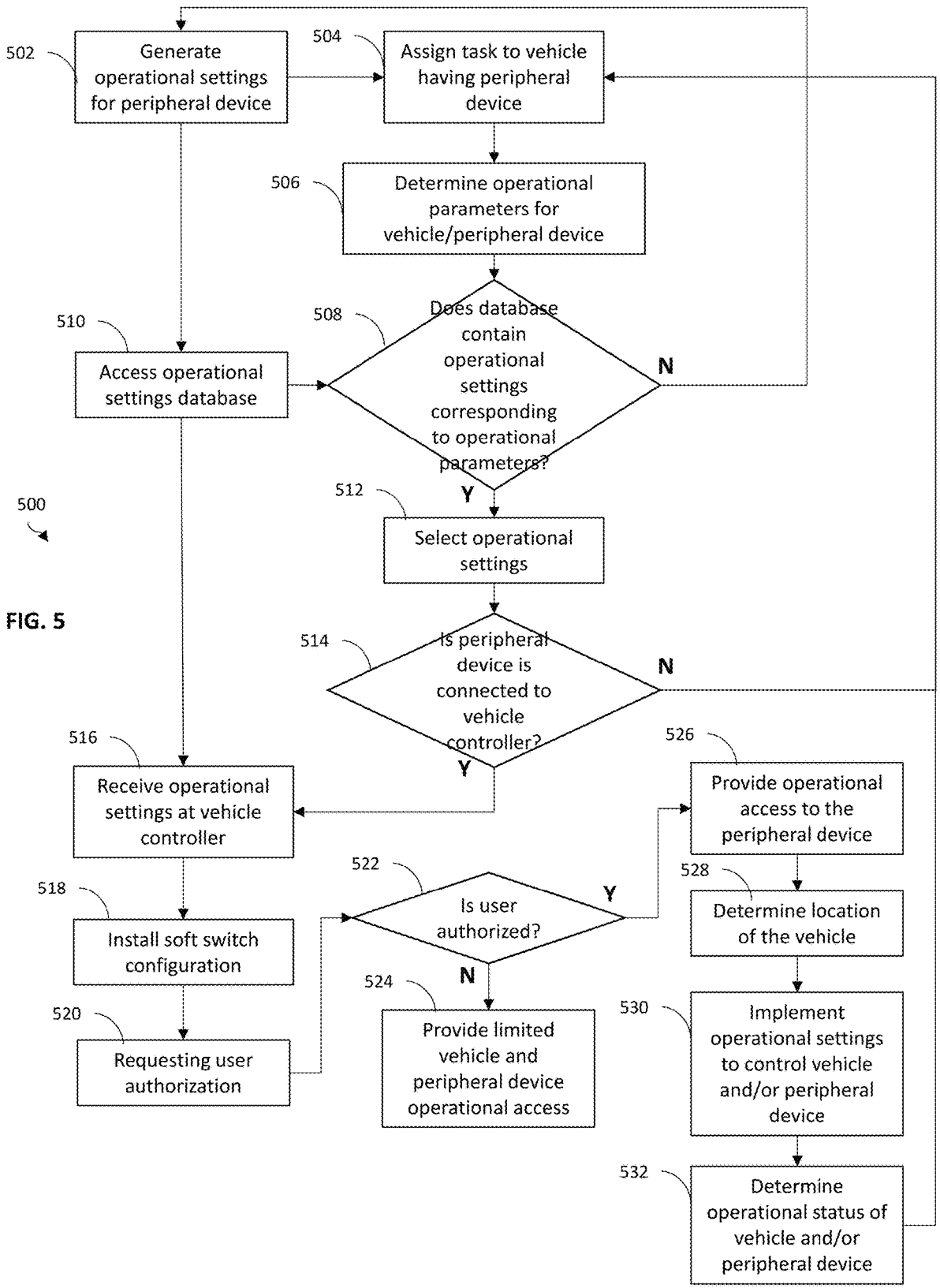
FIG. 5 shows a flow chart for operating a peripheral device of a vehicle, in accordance with some examples of the disclosure.
Figure 6A:
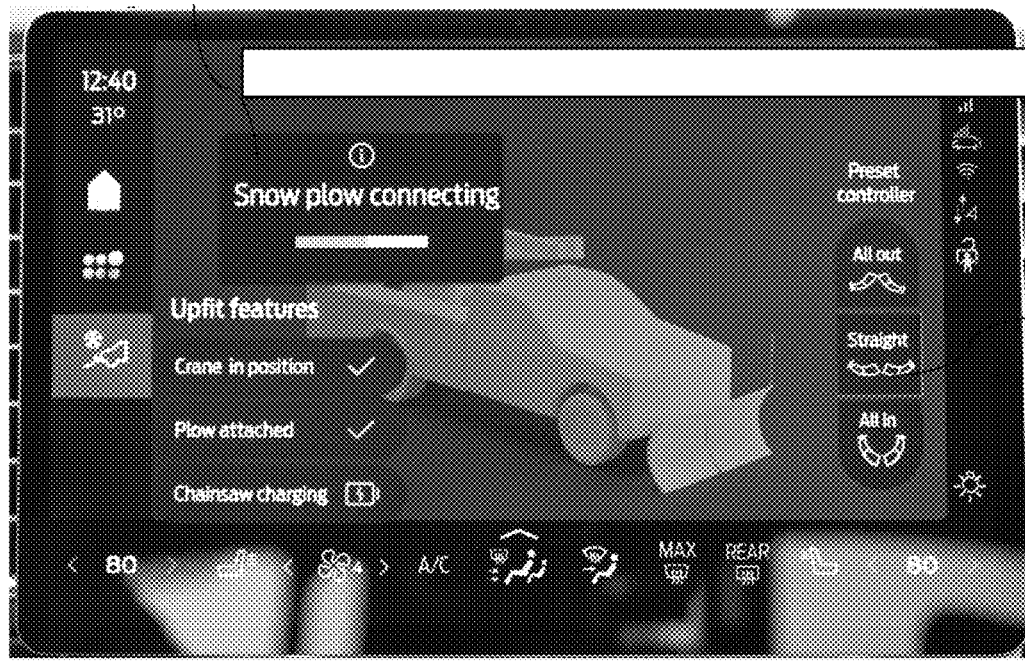
FIG. 6A illustrates an example of a vehicle interface, in accordance with some examples of the disclosure.
Figure 6B:
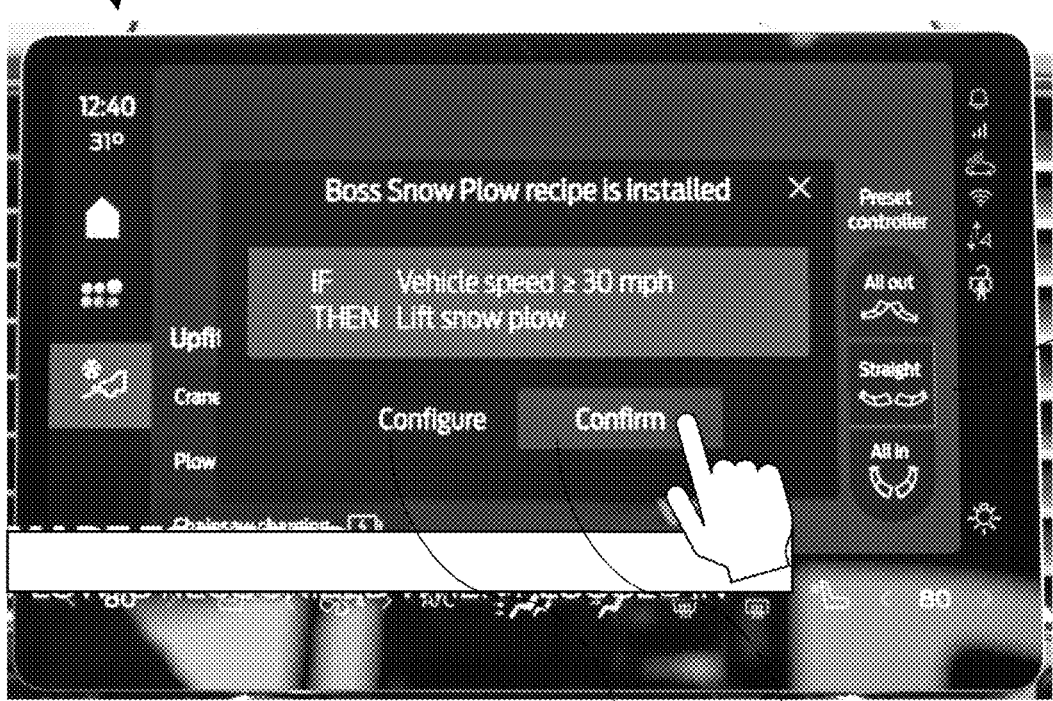
FIG. 6B illustrates an example of a vehicle interface, in accordance with some examples of the disclosure.

FIG. 3 shows a block diagram showing components of an example system 300 for operating a peripheral device of a vehicle. FIG. 4 illustrates an example of vehicle fitted with a peripheral device. FIG. 5 shows a flow chart for operating a peripheral device of a vehicle. FIGS. 6A and 6B illustrate examples of a vehicle interface. While the example shown in FIGS. 3 to 6B refers to the use of system 100, as shown in FIG. 1, it will be appreciated that the illustrative process shown in FIGS. 3 to 6B, may be implemented on system 100, system 200 or system 300, either alone or in combination with each other, and/or any other appropriately configured system architecture.

Referring to FIG. 3, system 300 comprises vehicle 301, operator server 304 and peripheral device 310, which are operationally coupled by communications network 308. Vehicle 301 comprises vehicle controller 302, vehicle interface 318, customization interface module 320, telematics module 322 and a set of vehicle subsystems 324, which includes, but is not limited to battery control module 326, powertrain control module 328 and suspension control module 330. Peripheral device 310 comprises control module 332, logic module 334 and one or more sensor modules 336. Additionally, FIG. 3 shows logic controller 338 connected to operator server 304. System 300 thus enables operational settings to be created, e.g., by operator 112 or automatically, using logic controller 338, and transmitted to telematics module 322 of vehicle 301, which is connected to vehicle controller 302. In this manner, vehicle controller 302 is able to receive operational settings issued by the operator server 304. Vehicle controller 302 is connected to customisation interface module 320, which is connectable to, e.g., by virtue of one or more wired or wireless connections, peripheral device 310. In some examples, operational settings may be transmitted directly to peripheral device 110, which may be transferred to vehicle controller 302 upon connection of peripheral device 310 to customisation interface module 320 of the vehicle.

Referring to FIG. 4, system 400 comprise vehicle 401, which includes vehicle controller 402 configured, in part, to receive operational settings, a first customisation interface module 420a configured to connect a first peripheral device 410a to vehicle controller 402, and a second customisation interface module 420b configured to connect a second peripheral device 410b to vehicle controller 402. However, vehicle 401 may comprise any appropriate number of customisation interface modules. In some examples, a customisation interface module may be configured to connect multiple peripheral devices to vehicle controller 402, or each peripheral device 110 may have a standalone customisation interface module.

Referring to FIG. 5, process 500 will be described in relation to the example of operating a peripheral device 110, e.g., a snow plough, fitted to vehicle 101a.

At 502, control circuitry, e.g., control circuitry of server 104, generates operational settings for one or more peripheral devices 110. For example, an operational setting may be input by operator 112 (and/or automatically generated in response to a negative output from 512, as described below), the operational setting defining how the peripheral device can be controlled. For example, the operational setting may prevent the use of the snow plough if one or more faults or errors are detected (such as, upon detection of an improper connection between control module 332 and customisation interface module 320), and/or if one or more operational conditions of the vehicle 101 and/or another peripheral device 110 connected to the vehicle 101 are not satisfied (such as, a parking brake status, a position of a crane, the presence of a qualified user, and/or operation of a safety beacon). The operational settings may be generated using logic controller 338, which comprises a logic tool for generation of one or more sets of rules/instructions, which define the operational setting. In some examples, an operational setting may be specific to a type of vehicle, a type of peripheral device, or a specific combination of vehicle and peripheral device. Additionally or alternatively, an operational setting may be specific to a particular user, and/or that user's schedule. For example, an operational setting may be generated that governs the use of a particular model of the snow plough fitted on vehicle type 101a, based on a level of qualification of a user assigned to operate the snow plough. Following generation of an operational setting, control circuitry causes the operational setting to be stored, e.g., in database 106.

At 504, control circuitry, e.g., control circuitry of server 104, assigns a task to vehicle 101a. For example, the task may be a job for operator 116 to clear snow from a certain portion of a road. In some cases, the task may be assigned by operator 112, e.g., a fleet manager of a commercial fleet, or a dispatch controller of an emergency service. In other example, the task may be assigned, e.g., automatically, in response to a request from a user, such as a private individual who requests one or more jobs to be carried out, e.g., in the context of a gig economy model.

At 506, control circuitry, e.g., control circuitry of server 104, determines operational parameters for vehicle 101a and/or the peripheral device 110. For example, control circuitry may determine that vehicle 101a is a particular type of vehicle, e.g., the capabilities of the particular type of vehicle, such as, whether the vehicle is fitted with one or more subsystems 324, and, where applicable, the status of those subsystems 324. Additionally or alternatively, control circuitry may determine which peripheral devices 110 are installed on vehicle 101a. For example, control circuitry may determine that vehicle 101a is fitted with a snow plough and a crane. Making such determinations is beneficial, since the operational capabilities and/or operational characteristics of the vehicle may vary, depending on the type of vehicle, the types of peripheral devices installed, and the status of the vehicle and the peripheral device. For example, a vehicle fitted with a crane will have an overall height and weight greater than the overall height and weight of a vehicle not fitted with a crane. As such, whether or not the vehicle has a crane may determine which tasks the vehicle may be able to undertake, e.g., due to height and weight restrictions along a route. Moreover, making such determinations allows appropriate operational settings to be selected. In some examples, 506 may be carried out prior to 504, e.g., so that a task may be assigned to a vehicle having appropriate capabilities to perform the assigned task.

At 508, control circuitry, e.g., control circuitry of server 104, determines whether database 106 contains any operational settings that correspond to or satisfy the operational parameters of vehicle 101a and peripheral device 110. For example, control circuitry may access, at 510, database 106 to search for one or more operational settings that match, e.g., within a predetermined threshold, criteria established by the operational parameters of vehicle 101a and peripheral device 110. For example, database 106 may comprise an operational setting that restricts usage, e.g., lowering, of a snow plough above a certain speed, e.g., 30 mph. However, operational parameters of vehicle 101a and the snow plough require restriction of snow plough use below 20 mph, e.g., based on the location of the task assigned at 504. In response to control circuitry identifying a suitable operational setting, process 500 moves to 512. In response to control circuitry not identifying a suitable operational setting, process 500 moves back to 502, where a new operational setting may be generated, either automatically, based on the operational parameters of vehicle 101a and/or peripheral device 110, or manually, based on input by operator 112.

At 512, control circuitry, e.g., control circuitry of server 104, selects any operational settings that correspond to the criteria established by the operational parameters. For example, control circuitry may tag, in database 106, one or more operational settings that may be suitable for use with vehicle 101a and the snow plough fitted to vehicle 101a, and which are suitable for the assigned task.

At 514, control circuitry, e.g., control circuitry of vehicle controller 102, determines whether a peripheral device is connected to vehicle controller 102. For example, peripheral device 110 may be connected to vehicle controller 102 by virtue of a hardware module, such as customization interface module 320. The customization interface module 320 may be an interface module(s) that has digital in/out pins, analogue in/out pins, high current switches and the ability to read and write controller area network (CAN) signals. The customization interface module 320 may be connected to telematics module 322, either directly or via vehicle controller 302, so that vehicle/peripheral status can be transmitted to server 104/database 106, and one or more operational settings be downloaded to vehicle controller 102 from server 104/database 106. In some examples, the connection method between vehicle controller 102 and peripheral device 110 may be simplified to an ethernet cable, wirelessly via Bluetooth and Wi-fi (or other wireless connection standard), or some other method. In some examples, the peripheral device 110 installed to vehicle 101a could be accredited by the vehicle manufacturer, a peripheral device 110 that has previously been used, e.g., for a previous task, or completely new.

When the peripheral device 110 is accredited by the vehicle manufacturer, the peripheral device 110 may have a microcontroller onboard, e.g., control module 332, that, when connected to vehicle controller 102, communicates a unique identifier. After this handshake, vehicle controller may request, e.g., from server 104, a default operational setting for the peripheral device. This allows vehicle controller 102 to determine which type of peripheral device 110 is connected, apply any logic, e.g., using logic module 334, including sending instructions to install a soft switch configuration, installing any logic related to peripheral device 110 (e.g., governing the operation of peripheral device 110 when the vehicle speed is stationary, a vehicle brake is on, a set of beacon lights are on, a vehicle motor is running, etc.). In some examples, control module 332 may also cause a set of default error messages to be installed in vehicle controller 302.

When the peripheral device 110 has previously been used, e.g., by an operator on a previous task, and is not accredited by the vehicle manufacturer, vehicle controller 102 may be configured to determine whether one or more appropriate operational settings are stored, e.g., in storage 228 of control circuitry 202. For example, control circuitry 202 may comprise a usage log relating to historical usage of the vehicle and one or more peripheral devices and associated logic sequences, e.g., that are stored on storage 228. In such cases, a vehicle manufacturer may provide instructions on how to connect peripheral device 110 and provide templates for operator 116 to configure a soft switch for controlling peripheral device operation. In some examples, such templates may be downloaded from a public marketplace. Alternatively, for proprietary peripheral devices or companies that have created their own logic sequences/operational settings, a template may be stored, e.g., on server 104/database 106, and can be re-used or edited and installed on vehicle.

When peripheral device 110 is a piece of equipment with no stored templates on server 104/database 106, or otherwise publicly available, a functional block programming method may be implemented, e.g., using logic controller 338, at 502.

At 516, in response to a positive determination at 514, control circuitry, e.g., control circuitry 218 of vehicle controller 102, receives one or more operational settings.

At 518, a soft switch configuration is installed on vehicle interface 318, so allow operator 116 to control peripheral device 110 in a manner governed by the operational setting (s). In the example shown in FIG. 6A, soft switch configuration 600 is being installed for controlling a snow plough. In the first instance, soft switch configuration 600 displays a connection status 602, which indicates the status of an operational connection between the snow plough and the vehicle controller 102. For example, connection of the snow plough may established following one or more safety checks, e.g., relating to the status off one or more vehicle subsystems 324. In the example shown in FIG. 6B, the operational settings are configured to install a soft switch configuration operable to allow operator 116 accept or reconfigure the operational settings. For example, an operational setting may be received and installed that lifts the snow plough when the vehicle speed is greater than 30 mph. This operational setting may have been selected based on it meeting criteria falling within a predetermined threshold, as discussed above. When operator 116 determines that this logic is acceptable, confirmation may be made using selectable icon 604. Should operator wish to change the logic of the operational setting, this can be done using selectable icon 606. Following operator either accepting or reconfiguring the logic, the snow plough can be controlled using pre-set snow plough operations 608, which, in this case, provide three pre-set operational positions for the snow plough.

At 520, control circuitry, e.g., control circuitry 218 of vehicle controller 102, requests authorisation that operator 116 is authorized to control peripheral device 110, e.g., by being of an appropriate level of qualification to operate peripheral device 110. For example, operator 116 may provide authorization using an authorization code, or any other conventional authorization process, such as facial recognition. In some examples, 520 may be performed prior to allowing operator 116 to accept or re-configure the operational settings, as discussed above.

At 522, in response to not receiving appropriate authorization, process 500 moves to 524, where limited vehicle 101a and peripheral device 110 operational access is granted to operator 116. For example, limited operational access may allow operator to perform one or more pre-set operations 608, but to not manually configure the operational settings. In response to receiving appropriate authorization, process 500 moves to 526, where vehicle 101a and peripheral device 110 operational access is granted to operator 116.

At 528, control circuitry, e.g., control circuitry 218 of vehicle controller 102, determines a location of vehicle 101. For example, control circuitry may access telematics module 322 to determine a current and/or a future location of vehicle 101a, e.g., based on information provided as part of the task assigned at 504.

At 530, control circuitry, e.g., control circuitry 218 of vehicle controller 102, implements an operational setting to control vehicle 101a and/or peripheral device 110. For example, the operational setting received at 516 may contain instructions to operate, e.g., automatically operate, one or more vehicle subsystems 324 and peripheral device 110, based on the location of vehicle 101a. For example, the operational setting may be configured to coordinate the operation of vehicle 101a and peripheral device 110. For example, installation of the snow plough to vehicle 101a may cause the operational dynamics of vehicle 101a to be changed, e.g., as a result of the additional mass of the snow plough. As such, it is beneficial to adjust, for example, a suspension setting of vehicle 101a, to compensate for the additional mass of the snow plough. In some cases, the operational dynamics of vehicle 101a may be adjusted based on the operational position of the snow plough and/or the location of vehicle 101a. For example, when vehicle 101a is in a depot, the plough may need to be in a raised position, plough usage may be not permitted, and vehicle 101a may be restricted to a maximum speed. As such, as first set of operational settings are needed. In a similar manner, when vehicle 101a is on a highway, a second set of operational parameters may be required, e.g., in addition to those above, to control vehicle dynamics, e.g., as vehicle 101a travels at high speed with additional mass. Additionally or alternatively, another set of operational parameters may be desired when vehicle is actually ploughing snow. For example, powertrain control module 328 and suspension control module 330 may controlled to provide a stable operation of vehicle 101a in snowy conditions.

At 532, control circuitry, e.g., control circuitry 218 of vehicle controller 102, determines an operational status of vehicle 101a and/or peripheral device 110. For example, control circuitry may monitor the operation of the vehicle 101a and peripheral device 110 to ensure that vehicle 101a and peripheral device 110 are functioning within an expected range of operating conditions, e.g., with regard to a power consumption and a range of motion. In some examples, the status of vehicle 101a and/or peripheral device 110 may be transmitted to server 104, so that operator can monitor vehicle 101a and/or peripheral device 110, e.g., to ensure that one or more future tasks are assigned to a vehicle and peripheral device operationally capable of carrying out a future task. In the example shown in FIG. 5, the output of 532 is used at 504, where tasks are assigned to a vehicle 101a and peripheral device 110.

The actions or descriptions of FIG. 5 may be done in any suitable alternative orders or in parallel to further the purposes of this disclosure.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one example may be applied to any other example herein, and flowcharts or examples relating to one example may be combined with any other example in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for operating a peripheral device of a vehicle, the method comprising:
    assigning a task to the vehicle, the task comprising instructions for an operator of the vehicle to complete using the vehicle and the peripheral device;
    determining one or more operational parameters relating to an intended operation of the vehicle and the peripheral device during the task;
    selecting operational settings based on the one or more operational parameters, the operational setting relating to how the peripheral device is to be used in conjunction with the vehicle for the task;
    determining that the peripheral device is connected to a vehicle controller;
    receiving, at the vehicle controller from a control center, operational settings for the peripheral device, in response to the determining that the peripheral device is connected to a vehicle controller; and
    controlling, using the vehicle controller, the peripheral device and the vehicle using the received operational settings during the task.

2. The method of claim 1, wherein the operational settings comprise instructions for installing a soft switch configuration, the method comprising:
    installing the soft switch configuration on a vehicle interface in response to determining the peripheral device is connected to the vehicle controller.

3. The method of claim 1, the method comprising:
    determining whether a database comprises operational settings corresponding to the one or more operational parameters; and
    in response to determining that the database does not comprise operational settings corresponding to the one or more operational parameters, generating new operational settings.

4. The method of claim 1, the method comprising:
    determining a location of the vehicle; and
    implementing the operational settings based on the location of the vehicle.

5. The method of claim 1, the method comprising:
    requesting, at the vehicle controller, a user authentication; and
    providing operational access to the peripheral device based on the user authentication.

6. The method of claim 1, the method comprising:
    providing the operational setting for user review on a vehicle interface;
    requesting user approval of the operational settings; and
    in response to receiving user approval of the operational settings, implementing the operational settings on the vehicle controller; or
    in response to receiving user disapproval of the operational settings, modifying the operational settings.

7. The method of claim 1, the method comprising:
    determining an operational status of the vehicle and the peripheral device; and
    selecting the operational settings based on the operational status of the vehicle and the peripheral device.

8. A system comprising control circuitry configured to carry out the method of claim 1.

9. The method of claim 1, wherein the operational settings match, within a predetermined threshold, criteria established by the operational parameters of vehicle and peripheral device.

10. The method of claim 1, wherein the operational parameters of vehicle and the peripheral require usage restriction during the task, and the operational setting restricts usage during the task.

11. A vehicle comprising control circuitry configured to:
    assign a task to the vehicle, the task comprising instructions for an operator of the vehicle to complete using the vehicle and the peripheral device;
    determine one or more operational parameters relating to an intended operation of the vehicle and the peripheral device during the task;
    select operational settings based on the one or more operational parameters, the operational setting relating to how the peripheral device is to be used in conjunction with the vehicle for the task;
    determine that a peripheral device is connected to a vehicle controller;
    receive, at the vehicle controller from a control center, operational settings for the peripheral device, in response to the determining that the peripheral device is connected to a vehicle controller; and
    control, using the vehicle controller, the peripheral device and the vehicle using the received operational settings during the task.

* * * * *